United States Patent Office 3,076,815
Patented Feb. 5, 1963

---

3,076,815
3-IMIDO-ISOINDOLINONES
André Pugin, Basel, Switzerland, assignor to J. R. Geigy
A.-G., Basel, Switzerland
No Drawing. Filed Oct. 24, 1958, Ser. No. 769,311
Claims priority, application Switzerland July 13, 1956
2 Claims. (Cl. 260—325)

The object of this invention is to provide a process of manufacture of pure 4.5.6.7-tetrahalogeno-3-imino-isoindoline-1-ones which are useful in the manufacture of valuable new azomethine dyes described and claimed in my copending application Serial No. 704,907, filed December 24, 1957, now U.S. Patent No. 2,973,358 of which the instant application is a continuation-in-part which in turn is a continuation-in-part of application Serial No. 669,928, filed July 5, 1957, now abandoned. Further objects of my invention are the new 4.5.6.7-tetrahalogeno-3-imino-isoindoline-1-ones.

My new compounds are obtained by treating suitably substituted o-cyanobenzoic acid esters with ammonia or primary amines. The reaction proceeds by addition of ammonia or primary amine while splitting off alcohol:

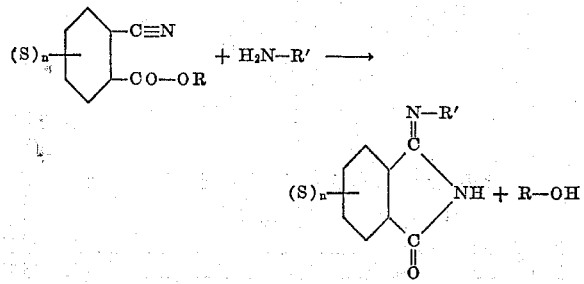

In these formulae S means any inert substituent, $n$ means a whole number from 0 to 4, —OR means the radical of an alcohol and R' means hydrogen or a monovalent organic substituent of the aliphatic, araliphatic, cycloaliphatic, aromatic-isocyclic or heterocyclic series. For the purpose of my new azomethine dyes, S means halogen such as fluorine, bromine and preferably chlorine and $n$ means 4. The invention is not restricted however to this specific case. Other substituents may be present at the benzo nucleus such as alkyl, halogenated alkyl, e.g. trifluoromethyl, acyl, alkyl sulphonyl, aryl sulphonyl, carboxylic acid ester, sulphonic acid amide groups. In the o-cyanobenzoic acid esters, the radical —OR corresponds preferably to a lower alkanol wherein R means e.g. methyl, ethyl, propyl, butyl, methoxy- or ethoxy-ethyl. But also the benzyl esters are very suitable.

The reaction is performed at low temperatures which, dependent on the reactivity of the components, can be raised if water is excluded. Room temperature is preferred. The ammonia or amine can be used in aqueous solution or preferably in organic inert solvents such as lower alcohols or ethers; an excess of ammonia or organic amine is of advantage. Liquefied ammonia and water-free amines may be used as the solvents.

The preferred amine in this process is ammonia. Aliphatic primary amines such as butylamine, amylamine, hexylamine, octylamine, araliphatic amines such as benzylamine; cycloaliphatic amines such as cyclopentyl- and cyclohexyl-amine; aromatic-isocyclic amines such as aniline, toluidines, xylidines, anisidines, phenetidines, chloranilines or 2-aminopyridines may also be used however. All these 3-imino derivatives of 4.5.6.7-tetrahalogeno-isoindoline-1-ones easily condense with polyprimary amino compounds to form the desired new azomethine dyes. Further substituted o-cyanobenzoic acid esters are, for example, easily prepared from corresponding phthalic acid anhydrides which, on treatment with phosphorus pentachloride, yield 3.3-dichlorophthalides which by the interaction of ammonia are transformed into the o-cyanobenzoic acid ammonium salts. The salts of o-cyanobenzoic acid may be esterified by treating them with esters of sulphuric acid, aromatic sulphonic acids or hydrohalogenic acids of alcohols.

As is apparent from the preceding description, the preferred objects of my invention are compounds of the general formula

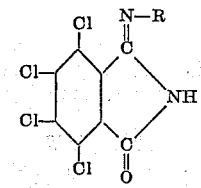

wherein R represents hydrogen or the radical of a primary organic amine. As the radical of a primary organic amine R may be an aliphatic radical e.g. methyl, ethyl, propyl, hydroxyethyl, butyl, amyl, hexyl, octyl, dodecyl; an araliphatic radical e.g. benzyl, chlorobenzyl; a cycloaliphatic radical e.g. cyclopentyl, cyclohexyl, methylcyclohexyl; a monocyclic aryl radical e.g. phenyl, alkylphenyl such as methylphenyl, ethylphenyl, butylphenyl, amylphenyl, alkoxyphenyl such as methoxyphenyl, ethoxyphenyl, halophenyl such as chlorophenyl, bromophenyl; a heterocyclic radical e.g. 2-pyridyl, 4-methyl-2-pyridyl, 6-methyl-2-pyridyl.

The following examples illustrate my invention. Where not otherwise stated parts are given as parts by weight. The temperatures are in degrees centigrade.

Example 1

A solution of 45 parts of 3.4.5.6-tetrachloro-2-cyanobenzoic acid methyl ester in 400 parts of methyl alcohol is saturated at room temperature with gaseous ammonia and the whole is stirred for 20 hours. The yellow precipitate formed is filtered off under suction and washed with water and alcohol. 40 parts of a pale yellowish product which melts at about 300° under decomposition are obtained. According to elementary analysis it is 3-imino-4.5.6.7-tetrachloro-isoindoline-1-one.

If 14.2 parts of this compound are heated for 1 hour at 150° with 6.5 parts of 4.4'-diaminodiphenyl chlorohydrate in 150 parts of nitrobenzene and the orange precipitate formed is filtered off hot under suction and washed with alcohol and water and dried, then 17 parts of the pure orange pigment are obtained.

3.4.5.6-tetrachloro-2-cyanobenzoic acid methyl ester can also be converted into 3-imino-4.5.6.7-tetrachloro-isoindoline-1-one with aqueous/alcoholic ammonia or with liquid ammonia at room temperature.

The 3.4.5.6-tetrachloro-2-cyanobenzoic acid methyl ester (M.P. 83–84°) used as starting material can be produced, for example, as follows: asymmetrical 4.5.6.7-tetrachloro-3.3-phthalyl chloride is reacted with aqueous ammonia whereupon the ammonium salt of 3.4.5.6-tetrachloro-2-cyanobenzoic acid is formed. This is converted in aqueous solution into the barium salt with barium chloride. The barium salt is converted into the 3.4.5.6-tetrachloro-2-cyanobenzoic acid methyl ester with dimethyl sulphate. Good yields are obtained.

Example 2

100 parts of concentrated ammonia are added to a solution of 3.8 parts of 3.4.5.6-tetrachloro-2-cyanobenzoic acid benzyl ester in 200 parts of methanol and the mixture is stirred for 40 hours at room temperature. 2.5 parts of 3-imino-4.5.6.7-tetrachloro-isoindoline-1-one are obtained.

The pigment dyestuffs are produced for example by heating 7.1 parts of 3-imino-4.5.6.7-tetrachloro-isoindoline-1-one in 1.35 parts of 1.4-diaminobenzene in 40 parts of naphthalene for 2 hours at 180–200°. The yellow coloured reaction mixture is then cooled to 150°, diluted with 100 parts of hot nitrobenzene and filtered hot. The residue is washed with nitrobenzene, alcohol and acetone. 5.6 parts of an orange-yellow pigment of good colour strength are obtained which pigment is distinguished in thermoplastic polymers by excellent fastness to light and migration. The 3.4.5.6-tetrachloro-2-cyanobenzoic acid benzyl ester used in this example (M.P. 105–107°) can be produced in the following way: the ammonium salt of 3.4.5.6-tetrachloro-2-cyanobenzoic acid is converted with silver nitrate into the silver salt and this is converted is good yield into the corresponding benzyl ester with benzyl iodide.

*Example 3*

15 parts of 3.4.5.6-tetrachloro-2-cyanobenzoic acid methyl ester are dissolved in 300 parts of methanol and 50 parts of n-butylamine are added. The solution is stirred for 40 hours at room temperature whereupon a yellowish precipitate is formed. The reaction product is poured into 500 parts of water and the precipitated product is filtered off. After recrystallization from alcohol, 3-butylimino-4.5.6.7-tetrachloro - isoindoline-1-one, (M.P. 115–118°) is obtained as a yellowish, crystalline substance.

Similar 2-alkylimino compounds are obtained if instead of the butylamine, corresponding amounts of amylamine or benzylamine are used.

Pigment dyestuffs are produced for example by refluxing 6.8 parts of 3-butylimino-4.5.6.7-tetrachloro-isoindoline-1-one and 1.2 parts of 2.6-diaminotoluene in 150 parts of glacial acetic acid for 2 hours. A pure yellow pigment is formed which is filtered off hot and purified by washing with glacial acetic acid, alcohol and acetone. In thermoplastic polymers dyed therewith, it has excellent fastness to light and migration.

*Example 4*

10 parts of 3.4.5.6-tetrachloro-2-cyanobenzoic acid methyl ester are heated for 6 hours at 150° with 50 parts of aniline. Alcohol is added to the solution obtained whereupon 3-phenylimino-4.5.6.7-tetrachloro-isoindoline-1-one precipitates as a yellow substance (M.P. 260–262°).

To produce pigment dyestuffs for example, 9 parts of this compound are refluxed for 2 hours with 2.3 parts of 4.4'-diaminodiphenyl in 200 parts of glacial acetic acid. The precipitate is filtered off hot, washed with glacial acetic acid, alcohol and acetone and, after drying, 7.5 parts of an orange pigment are obtained.

Corresponding amounts of toluidine or xylidine can be used instead of the aniline in the process described above, whereupon the corresponding 1-phenylimino compounds are obtained.

What I claim is:

1. The compound of the formula

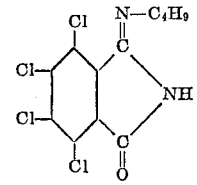

2. The compound of the formula

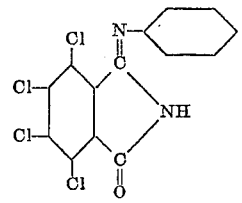

References Cited in the file of this patent

UNITED STATES PATENTS

| | | |
|---|---|---|
| 2,537,352 | Jones | Jan. 9, 1951 |
| 2,701,252 | Vollman et al. | Feb. 1, 1955 |
| 2,727,043 | Rosch | Dec. 13, 1955 |

OTHER REFERENCES

Ind. and Eng. Chem., vol. 39, 11, page 1420 (1947).

Dunet et al.: Bull. Soc. Chem. (Fr), pages 889–90 (1948).

Clark: Journ. Chem. Soc. (London), page 3593 (1953).